(12) United States Patent
Coster et al.

(10) Patent No.: US 8,663,787 B2
(45) Date of Patent: Mar. 4, 2014

(54) HIGH REFLECTION GLAZING

(75) Inventors: Dominique Coster, Jumet (BE); Gaetan Di Stefano, Jumet (BE); Laurent Dusoulier, Jumet (BE)

(73) Assignee: AGC Glass Europe, Bruxelles (BE)

( * ) Notice: Subject to any disclaimer, the term of this patent is extended or adjusted under 35 U.S.C. 154(b) by 122 days.

(21) Appl. No.: 13/062,400

(22) PCT Filed: Sep. 17, 2009

(86) PCT No.: PCT/EP2009/062043
§ 371 (c)(1),
(2), (4) Date: Mar. 4, 2011

(87) PCT Pub. No.: WO2010/031808
PCT Pub. Date: Mar. 25, 2010

(65) Prior Publication Data
US 2011/0183129 A1    Jul. 28, 2011

(30) Foreign Application Priority Data

Sep. 17, 2008 (EP) .................... 08164513

(51) Int. Cl.
*B32B 7/02* (2006.01)
(52) U.S. Cl.
USPC .......................................... 428/212; 428/220
(58) Field of Classification Search
USPC ...................... 428/212, 220, 411.1
See application file for complete search history.

(56) References Cited

U.S. PATENT DOCUMENTS

| 5,543,229 | A | * | 8/1996 | Ohsaki et al. ............... 428/432 |
| 6,436,542 | B1 | | 8/2002 | Ogino et al. |
| 7,794,831 | B2 | * | 9/2010 | Faris ........................... 428/336 |

| 2001/0031365 | A1 | 10/2001 | Anderson et al. |
| 2002/0102414 | A1 | 8/2002 | Mitsuishi et al. |
| 2007/0184291 | A1 | 8/2007 | Harris et al. |

FOREIGN PATENT DOCUMENTS

| EP | 1 068 899 | 1/2001 |
| EP | 1 211 524 | 6/2002 |
| FR | 2 793 889 | 11/2000 |
| WO | 00 12304 | 3/2000 |
| WO | 2007 010462 | 1/2007 |

OTHER PUBLICATIONS

Burdis, M. S., "Properties of Sputtered Thin Films of Vanadium-Titanium Oxide for Use in Electrochromic Windows", Thin Solid Films, vol. 311, No. 1-2, pp. 286-298 (Dec. 31 1997) XP-004121356.
Motov, O. A. et al., "Properties of Thin Layers of Mixtures of Titanium, Niobium and Zirconium Oxides, Obtained by Cathode Suttering", Optiko Mehaniceskaa Promyslennost, vol. 45, No. 3, pp. 47-49 (Jan. 1, 1978) XP-008023034.
International Search Report Issued Dec. 30, 2009 in PCT/EP09/062043 filed Sep. 17, 2009.

* cited by examiner

*Primary Examiner* — Maria Veronica Ewald
*Assistant Examiner* — Lawrence Ferguson
(74) *Attorney, Agent, or Firm* — Oblon, Spivak, McClelland, Maier & Neustadt, L.L.P.

(57) ABSTRACT

The invention relates to a glazing that comprises at least one layer deposited by cathodic spraying under vacuum, said layer containing one or more oxides and a proportion in weight of titanium oxide of at least 40% and not exceeding 95%. The thickness of the layer in question and optionally the thickness of the other layers containing metal oxide is/are selected so that on a clear "float" glass sheet having a thickness of 4 mm, said layer(s) would yield a reflection of at least 15% and a light transmission of at least 60%. The layer or layer system in question further has a mechanical and/or chemical resistance comparable to that of layers produced by pyrolysis for obtaining products having the same kind of optical properties.

20 Claims, 1 Drawing Sheet

HIGH REFLECTION GLAZING

Figure 1:
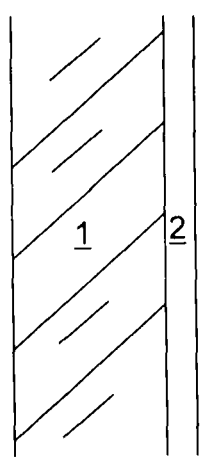

The present invention relates to glazing systems that have a high reflection in the visible range while retaining a significant transmission.

The glazing systems in question are suitable in particular for restricting the supply of natural energy especially in buildings exposed to a significant amount of insolation. The restriction of energy supply allows savings to be made in the use of air-conditioning. The glazing systems in question are also characterised by their "solar factor", a magnitude indicating the ratio of energy both transmitted through the glazing and reemitted by this towards the interior after absorption to the total incident energy.

Glazing systems of this type are often formed by covering the glass sheet with a layer or a system of so-called "hard" layers. These layers are traditionally deposited by pyrolysis onto the hot glass immediately after formation of the sheet. The most usual method is to conduct the pyrolysis "on line", i.e. at the glass production site itself. The ribbon of glass formed on the "float" line is covered while it is still at high temperature.

A recognised feature of products obtained by pyrolysis is that they are relatively hard. They are highly resistant to both chemical and mechanical stresses. For this reason they are convenient to use, possibly exposing the covered face to external unknown factors. This special feature distinguishes the layers obtained by pyrolysis from those produced using cathodic sputtering vacuum deposition methods, wherein these two types of techniques constitute the two most widely used methods for the production of thin layers on a glazed support.

In contrast, the layers obtained by cathodic sputtering under vacuum are referred to as "soft". Their inadequate mechanical or chemical resistance means that these layers are essentially used in configurations where they are not exposed to these stresses. This is the case with multiple glazing systems. In these glazing systems the layers are turned towards the spaces located between the sheets.

While the use of pyrolytic layers is technically satisfactory, it is closely linked with the availability of specific adapted precursors. The available precursors do not allow production of the combination of accessible layers. Furthermore, the implementation of pyrolysis techniques requires the provision of specific installations that are very heavy and must be integrated into the production lines, which by nature and in the interests of economies of scale are necessarily restricted in number and therefore are distributed sparsely geographically over the areas where these products are destined.

The installations for coating by means of cathodic sputtering under vacuum are independent of the glass production plant. The coating operations using these techniques are conducted at a later stage, in other words on glass produced previously that may in the meantime have been stored, transported, recut etc.

For logistical reasons in particular the aim of the invention is to enable glazing systems coated by cathodic sputtering to be supplied that have the qualities of products obtained by pyrolysis. It is clearly necessary that the production of these glazing systems remains comparable with that of glazing systems coated by pyrolysis.

Layers deposited by cathodic sputtering under vacuum and what leads to interesting solar factors are known. This is the case in particular with titanium oxide. However, as indicated above, these layers are insufficiently mechanically resistant to be able to be used except as non-exposed faces of the glazing systems in question.

The inventors have shown that a highly specific choice of materials that form these layers deposited by cathodic sputtering will enable the indicated resistance requirements to be met.

The inventors have also shown that by choosing the appropriate layers or layer systems produced it is also possible to subject the glazing systems in question to subsequent intensive thermal treatments without impairing the essential features provided by these layers.

The layers or layer systems considered according to the invention do not contain any infrared-reflecting metal layer, in particular silver-based layers, since the systems containing these silver-based layers fundamentally show a clear fragility towards external stresses.

The aim of the invention is to provide glazing systems that meet the requirements outlined above.

The inventors have shown that this aim can be achieved by the glazing systems defined in claim 1. It is noteworthy that the layers containing titanium oxide in association with other oxides enable the desired features, in particular with respect to resistance, to be met, while, as indicated above, layers of titanium oxide alone have inadequate resistance.

The reasons for the quality of the layers used according to the invention are not fully clear. It is likely that the fact that a layer composed of titanium oxide is deposited with another oxide leads to a modification in the structure of the layer. The formation of crystals is certainly modified. The presence of two constituents or more that have crystallographic features that are not the same leads to a very specific growth, probably avoiding in particular the formation of more fragile structures like columns.

Quite a variety of oxides are likely to be associated with titanium oxide in this layer. Included among the usable oxides in particular are those of the following compounds: Al, Zr, Hf, Nb, V, Mn, Fe, Co, Ni, Cu, Si. The oxides preferred amongst these are in particular those of Al, Zr, Hf, Nb and most particularly the oxide of Zr.

It is particularly advantageous if the zirconium oxide included in the titanium oxide-based layer is present at the rate of 25% to 60% by weight and preferably 40% to 55%. Zirconium oxide is particularly advantageous in that in addition to providing the sought resistance properties, since its refractive index is close to that of titanium oxide, the optical properties of the coated glazing systems and in particular reflection are also close to those observed with a titanium oxide layer.

The resistance of the titanium oxide-based layer depends on its composition as well as its thickness. While an increase in thickness is accompanied by an increased resistance, the improvement is not significant above a certain threshold and the additional cost for a thicker deposit becomes unnecessary.

The titanium oxide-based layer according to the invention preferably has a thickness in the range of between 150 and 900 Å, preferably between 200 and 500 Å and advantageously from 250 to 350 Å.

The choice of thickness of the titanium oxide-based layer also depends on the presence of other layers, and more so on the desired qualities in terms of reflection, transmission and absorption of the incident light. In the case of the glazing systems according to the invention the reflection, which is generally at least 15% when the layer or layer system is applied to 4 mm thick clear glass, is advantageously in the range of between 20% and 40% in the same conditions.

The thickness of the titanium oxide-based layer or of the layer system in which it is included, and in particular its index, determines the reflection obtained as well as other optical values, in particular light transmission. In the case of the glazing systems according to the invention the light transmission is at least 60%. The light absorbed by the glazing remains relatively low. It is advantageously less than 20% and preferably less than 10%.

In the glazing systems according to the invention the titanium oxide-based layer can be associated with other layers to improve its properties or provide it with properties that the titanium oxide-based layer would not provide or not to an appropriate degree for the envisaged use.

The protection provided by the titanium oxide-based layer does not necessarily mean that the reflection originates from this layer exclusively. Once the necessary resistance is obtained, the layer system can include other layers to contribute to the reflection in particular. On this basis, a layer with a high reflection, and therefore a high index, can be associated with the titanium oxide-based layer and layer of another oxide. Since expediently this or these complementary layers must also have a high reflection factor, a particularly preferred layer is a layer of titanium oxide. This layer has the special feature in relation to titanium oxide-based layers that it has a higher refractive index. As an indication, the layers containing titanium oxide and zirconium oxide in association (50/50% by weight) deposited under vacuum have an index in the order of 2.35. The layers of $TiO_2$, whether stoichiometric or not, the latter usually being referred to as TXO, which can be obtained in particular by using ceramic cathodes, have an index in the order of 2.45-2.50. The combination of a layer of $TiO_2$ or TXO with a layer of a titanium oxide-based alloy thus provides, if need be, the benefit of both a good resistance as a result of this last layer and a higher index overall.

The glazing systems according to the invention can be used without any modification other than obtaining the desired dimensions and inserting them into frames. The glazing systems in question are essentially plane in this case. The need to dimension them after coating means that the glass sheets that form part of these glazing systems are not subjected to a thermal treatment first. Since stresses are necessarily present in the case of the thermal treatments in question, these provide the glazing systems with mechanical properties that at the same time ensure an improved impact resistance and, above all in the case of violent impact, cause these glazing systems to break into multiple fragments of small dimension.

If glazing systems that are either curved or toughened are desired, it is necessary to undergo a thermal treatment at elevated temperature after the application of the layers. These treatments subject the glazing systems to temperatures that exceed 550° C. and often 600° C. for quite an extended time. Thus, in the case of the curving or bending operation, the transformation can require these temperatures to be maintained for several minutes, taking into account the thermal inertia of the glass in particular. The amount of time these temperatures are maintained can reach 5 minutes or more depending on the techniques used and the thickness of the treated sheets.

Thermal treatments such as toughening or bending are known to be likely to impair the thin layers deposited on the glass sheets. Regardless of the impairments that can occur in the structure of certain layers as a result of the temperature, the glass substrate can also cause undesirable modifications.

Overall, the titanium oxide-based layers considered according to the invention do not undergo any detrimental change in structure in the conditions of these thermal treatments. The structure of the layers remains substantially unchanged. However, when sheets of soda-lime-silica glass, in other words the most usual glasses, are subjected to elevated temperatures this can cause impairment of the layers that they are coated with. At the temperatures in question, the alkaline constituents of these glasses are likely to migrate and diffuse into the layers in contact with the glass. The diffusion of these mobile elements often causes the appearance of a "haze" that is more or less pronounced.

The appearance of the haze corresponds to a light diffusion mechanism due to the presence of foreign elements in the structure of the layer.

In practice, the products used must be highly transparent. The proportion of diffused light in relation to transmitted light must not exceed 2% and preferably not exceed 1%. These limits can be exceeded if no precaution is taken to protect the titanium oxide-based layers of the type used according to the invention.

To prevent the diffusion phenomena, in particular diffusion of the alkaline ions of the glass into the layers, it is known to arrange layers that block the passage of these ions, these layers being interposed between the substrate and the layer to be protected. Protection layers of this type are in particular layers of $SiO_2$. While their blocking quality is well known, their production by means of cathodic sputtering remains relatively costly. Since it is desirable to conduct the deposition of the layers in the same manner and in one pass, it may be preferable to substitute layers that have the same properties but are easier to form for the silicon dioxide layers.

According to the invention, it is proposed to use either a layer of $SiO_2$ or at least one tin oxide-based layer or also a layer of silicon nitride $Si_3N_4$ as the layer that hinders the diffusion of constituents from the substrate into the modified titanium oxide-based layer.

If a tin oxide-based layer is used, it contains at least 30% and preferably at least 40% by weight of tin oxide.

The tin oxide-based layer also preferably contains zinc oxide. The combination of these two oxides has the advantage, in addition to a high deposition rate as a result of the cathodic sputtering techniques, of resulting in layers with a structure that is highly stable in the thermal treatments considered.

Zinc oxide alone is not desirable as the diffusion-blocking layer because of its tendency to form column structures, in particular if its thickness exceeds around ten nanometers. These structures are not very effective against diffusion phenomena.

The combination of zinc oxide and tin oxide prevents the formation of column structures so long as the tin oxide content remains adequate.

The presence of a layer that blocks the diffusion of constituents of the glass modifies the optical properties of the glazing. In particular, the presence of a tin oxide-based layer that has a refractive index lower than that of the titanium oxide-based layer modifies the reflection.

So that the reflection of the glazing is not reduced excessively, it is preferably ensured that when a tin oxide-based layer is used, its thickness is properly adjusted. This thickness is preferably less than 1.2-times the thickness of the titanium oxide-based layer.

The layers or layer systems used according to the invention must still lead to glazing systems, in which the coloration caused by these layers meets the market requirement. Some colorations, in particular in reflection, must be excluded. This is the case in particular with substantially "purple" colorations. These colorations occur when after being analysed in the CIE system (Commission Internationale de l'Éclairage) parameters a* and b* meet the following conditions: in the case of an illuminant D and a solid angle of 10° at most a*≤0 and b*≤6. In the case of negative values of a*, the coloration is either slightly blue or slightly green. These colorations in reflection are acceptable even if neutrality in coloration is preferred.

It is also preferred in the case of a thermal treatment if this does not cause any significant modification in the coloration in reflection. When the products present substantially the same colorations, it is possible to use in the same assembly bent products or other products that are not bent, for example, without there being any difference in appearance. The products can be combined without adversely affecting the aesthetic appearance.

In practice, the more "neutral" the products are, the more their coloration, before and after thermal treatment, will allow them to be juxtaposed.

In practice, glazing systems that meet these coloration requirements preferably show variations in a* and b*, both before and after thermal treatment, such as $\Delta E^* \leq 2$ and advantageously $\Delta E^* \leq 1$, where:

$$\Delta E^* = (\Delta a^{*2} + \Delta b^{*2})^{1/2}$$

Apart from layers that determine the optical characteristics of the glazing systems according to the invention, and in the aim of protecting these layers even further from risks of deterioration in the subsequent operations, in particular storage and transport, it is possible and advantageous to cover these layers with a temporary coating, which is removed before these glazing systems are installed.

It is known to cover glazing systems with various soluble waxes or polymers that can be removed by washing. These products can be used to protect the layers used according to the invention.

Use of these protection products requires two additional operations to be conducted on these glazing systems: application on the one hand and the subsequent washing on the other. In the case of glazing that must undergo thermal treatment, it is preferred that a carbon covering is used that can be integrated into the cathodic sputtering deposition operations and will be removed during the thermal treatment by combustion on contact with air.

The glazing systems according to the invention are formed from glass sheets of different thicknesses. They can also be formed from clear or solidly coloured glass sheets, principally to provide them with aesthetic qualities, but also possibly to configure their opto-energetic properties.

It is possible to use more absorbent glasses than clear glasses, in particular grey glasses or glasses that are predominantly slightly blue or green. It is preferred when coloured glasses are used that the dominant wavelength in reflection $\lambda_m$ for an illuminant D65 at a solid angle of 2° is in the range of between 475 and 600 nm.

Figure 2:
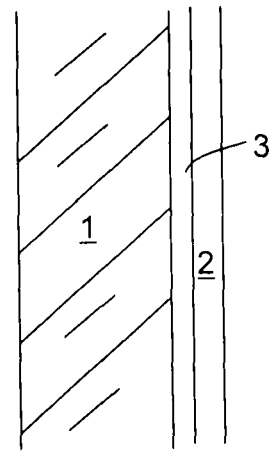
Figure 3:
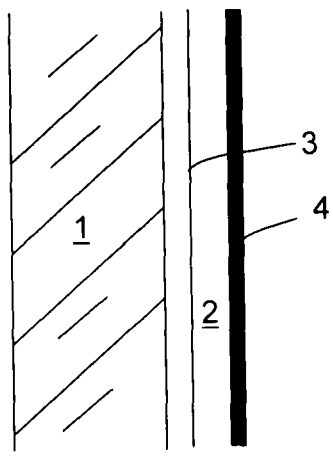

The invention is described in detail below on the basis of exemplary embodiments of the invention with reference, if necessary, to the attached drawings, to wherein FIGS. 1 to 3 are schematic views of glazing systems according to the invention.

FIG. 1 shows a glazing system 1 comprising a titanium oxide-based layer 2. The respective thicknesses are not adhered to for reasons of clarity.

FIG. 2 shows a glazing system according to the invention which in addition to the titanium oxide-based layer 2 comprises a layer 3 with the role of blocking the diffusion of constituents of the glass sheet 1.

FIG. 3 shows a glazing system according to the invention which comprises a protection covering 4 in addition to the preceding layers. The purpose of the covering in question that is applied on a temporary basis is essentially to prevent scratch marks and other mechanical changes that are likely to affect the functional layers 3. In the case where the glazing systems undergo a thermal treatment subsequent to the formation of the functional layers, this protection layer is advantageously formed from a material that is removed by combustion during this thermal treatment. A carbon layer is particularly advantageous for the formation of this covering.

The products according to the invention are analysed in particular for their mechanical or chemical resistance properties. The tests they are subjected to are the same as those used for the evaluation of similar glazing systems having functional layers produced by pyrolysis. The glazing systems according to the invention must attain equivalent performance levels.

The tests routinely comprise humidity resistance tests (21 days in a climatic chamber), chemical resistance tests (neutral saline mist for 21 days and five cycles of exposure to $SO_2$), a test for abrasion resistance (AWRT—automatic web rub test) and for scratch resistance (DBT—dry brush test). The chemical resistance tests are those described in the draft standard prEN 1096-2. The abrasion tests are specific to tests on layers deposited by magnetron sputtering. These two tests are substantially more "severe" than similar tests described in the standard mentioned above. In other words, the abrasion tests successfully passed in the conducted examples are necessarily satisfactory in the conditions of this standard.

The test in the climatic chamber consists of exposing the sample to the conditions in a furnace maintained at $40 \pm 1.5°$ C. for 21 days. The test is successful if the sample remains devoid of spots. Each day of ageing in these conditions corresponds to a year of exposure to usual atmospheric factors.

The sample must not be discoloured or generally bear any flaws of any type whatsoever such as detachment of the layer.

The test for resistance to an acid atmosphere is conducted in the following manner:

The sample is placed in a chamber filled with an acid atmosphere (two liters of water to 2 liters of $SO_2$) brought to 40° C. for 8 hours. After being brought back to ambient temperature, the sample still remains in the atmosphere in question for a further 16 hours. The same cycle is repeated 4 times. The layer must not become detached.

The AWRT (automatic wet rub test) is conducted with a circular Teflon head covered in a cotton fabric (ADSOL re. 40700004). This is moved over the layer under a load of 1050 g. The cotton is kept damp during the entire test using demineralised water. The oscillation frequency is 60 to 90 per minute. The samples are monitored to detect any impairments to the layer.

The DBT (dry brush test) is conducted on an Erichsen apparatus (model 494) fitted with a standardised brush (ASTM D2486). Each fibre of the brush has a diameter of 0.3 mm. The fibres are arranged in bundles 4 mm in diameter. The total weight applied by the brush and its support is 454 g. The test comprises 1000 cycles back and forth.

Measurements of the optical magnitudes are made in accordance with standard EN410.

The samples are formed from sheets of 4 mm thick clear float glass.

EXAMPLE 1

A layer of titanium oxide comprising 12% aluminium atoms in relation to the total of the metal atoms is deposited. The thickness of the layer amounts to 572 Å.

The chemical and mechanical resistance tests are satisfactory. The optical properties of the sample are in transmission, reflection (at 2°) and in the case of colorimetric data (illuminant D65 at 10°) are in transmission and in reflection:

| LT | R | a* trans. | b* trans. | a* ref. | b* ref. |
|---|---|---|---|---|---|
| 71.1 | 26.9 | 0.3 | −0.3 | −3.1 | 1.2 |

EXAMPLES 2, 3 AND 4 AND 2', 3', 4'

The samples of Examples 2 and 3 relate to a layer of titanium oxide to 50% by weight, the remaining 50% being zirconium oxide. In Example 2 the layer has a thickness of 300 Å. In the case of Example 3 the layer is 600 Å.

Sample 4 has a first layer of 50% by weight of tin oxide and 50% by weight of zinc oxide. In this case the two layers each have a thickness of 300 Å.

Samples 2', 3', 4' are identical in structure to the preceding ones. They are subjected to a thermal treatment of 670° C. for 8 and a half minutes.

All the samples without thermal treatment pass the chemical tests. The abrasion test is passed in the case of samples 3 and 4.

Samples 2' exhibit a haze that slightly exceeds the limit of that considered acceptable. Samples 3', of the same type but having a slightly thicker layer, do slightly better with respect to the haze formation in the acid tests that prove to be the most severe.

Samples 3' and above all 4' successfully withstand the abrasion tests.

The optical properties of these samples are indicated in the following table:

| | LT | R | a* trans. | b* tans. | a* ref. | b* ref. | ΔE* ref. |
|---|---|---|---|---|---|---|---|
| 2 | 75.93 | 21.04 | −1.0 | 5.05 | −1.41 | −9.59 | |
| 2' | 75.44 | 21.33 | −0.99 | 5.14 | −1.54 | −9.32 | 0.43 |
| 3 | 64.88 | 32.16 | −0.05 | 0.98 | −2.22 | −0.81 | |
| 3' | 64.58 | 32.27 | −0.09 | 0.70 | −2.25 | −0.21 | 0.60 |
| 4 | 69.48 | 27.54 | −0.45 | 1.37 | −2.13 | −1.25 | |
| 4' | 70.41 | 26.06 | −0.58 | 1.51 | −2.00 | −1.74 | 1.45 |

EXAMPLES 5 TO 12 AND 5' TO 12'

Different layer systems comprising a tin oxide-based layer and a zinc oxide-based layer are tested in the above conditions.

The composition of the layer systems used and their thicknesses in Å are indicated in the following table, in which:

TZO indicates a layer of titanium oxide with 50% by weight of zirconium oxide;

ZSO5 indicates a layer of tin oxide with 50% by weight of zinc oxide;

TCrO indicates a layer of titanium oxide with 8% by weight of chromium oxide;

$SnO_2$ indicates a layer of tin oxide without any other oxide.

| | ZSO$_5$ | SnO$_2$ | TZO | TCrO |
|---|---|---|---|---|
| 5 | 300 | | 300 | |
| 6 | 250 | | 250 | |
| 7 | | 300 | 300 | |
| 8 | | 250 | 250 | |
| 9 | | 200 | 200 | |
| 10 | | 300 | | 300 |
| 11 | | 250 | | 250 |
| 12 | 250 | | | 250 |

The samples subjected to the abrasion tests all reached the result graded 4 which amounts to an acceptable result.

When subjected to the thermal treatment used previously (670° C. for 8 and a half minutes), this results in the optical properties collated in the following table, in which g is the solar factor.

| | LT | R | g | Selec. | a* trans. | b* trans. | a* ref. | b* ref. |
|---|---|---|---|---|---|---|---|---|
| 5' | 70.9 | 26.2 | 71.8 | 0.99 | −0.2 | 4.5 | −1.8 | −5.8 |
| 6' | 74.7 | 23.1 | 74.3 | 1.01 | −0.5 | 4.3 | −1.5 | −7.8 |
| 7' | 68.8 | 29.7 | 70.1 | 0.98 | 0 | 3.4 | −2 | −5.2 |
| 8' | 68.8 | 26.3 | 70.8 | 0.97 | 0.5 | 7.4 | −1.8 | −7.9 |
| 9' | 73.8 | 22.8 | 73.8 | 1 | −0.3 | 6.1 | −1.5 | −9.2 |
| 10' | 71.4 | 26.6 | 71.7 | 1 | −0.4 | 6.9 | −1.9 | −9.4 |
| 11' | 72.1 | 25.7 | 72.2 | 1 | −0.5 | 6.5 | −2 | −8.9 |
| 12' | 7−.8 | 20 | 75.8 | 1.01 | −0.7 | 4.9 | −0.5 | −6.8 |

EXAMPLES 13 TO 15

A layer of $SiO_2$ is used for protection against diffusion for these examples. The thicknesses of the $SiO_2$ layers and of the titanium oxide comprising 50% zirconium oxide are expressed in Å. The table also includes reflection values and the variations in reflection and in values a* and b* after the glazing has been subjected to the thermal treatment indicated above:

| | SiO$_2$ | TZO | R | ΔR | Δa* | Δb* |
|---|---|---|---|---|---|---|
| 13 | 100 | 500 | 29.49 | 0.03 | −0.01 | −0.11 |
| 14 | 300 | 500 | 29.4 | 0.05 | −0.04 | −0.31 |
| 15 | 170 | 380 | 24.64 | −0.02 | −0.08 | 0 |

The modifications in properties resulting from the thermal treatment remain very limited.

The samples additionally passed the tests for resistance to humidity, to saline mist, in the climatic chamber and to abrasion.

EXAMPLES 16 TO 19

The examples relate to glazing systems, in which the modified titanium oxide layer is associated with a layer for preventing diffusion composed of silicon nitride. Results the same as those above also appear in the table.

| | Si$_3$N$_4$ | TZO | R | ΔR | Δa* | Δb* |
|---|---|---|---|---|---|---|
| 16 | 100 | 500 | 29.94 | 0.05 | 0 | −2.03 |
| 17 | 250 | 250 | 24.48 | −0.98 | −0.04 | −0.29 |
| 18 | 300 | 500 | 28.06 | 0.46 | −0.11 | −2.1 |
| 19 | 300 | 200 | 23.37 | −1.01 | 0.07 | −0.26 |

As above, the variations caused by the thermal treatment remain limited and the mechanical and chemical resistance meet practical requirements.

EXAMPLES 20 TO 22

In these examples the $TiO_2$-based layer (TNO) is modified by niobium oxide (50% by weight). The anti-diffusion layer is made from tin oxide. Results the same as above also appear in the table.

|    | $SnO_2$ | TNO | R    | ΔR   | Δa*  | Δb*  |
|----|---------|-----|------|------|------|------|
| 20 | 300     | 300 | 30.0 | −1.1 | −1.4 | −1.4 |
| 21 | 400     | 200 | 28.1 | −0.5 | −2.1 | −2.1 |
| 22 | 400     | 400 | 29.6 | 0    | −3.6 | −3.6 |

As above, the samples exhibit a good mechanical and chemical resistance.

EXAMPLES 23 TO 29

The examples are all conducted with several layers providing reflective properties. A titanium oxide layer is associated with the layer that assures chemical and mechanical resistance. In the case of Examples 23 and 24 the upper layer (TZO) is titanium- and zirconium oxide-based (50% by weight). Examples 25 to 29 have a layer comprising niobium oxide (50% by weight) for the upper layer (TNO).

The following results are obtained:

|    | $TiO_2$ | TZO/TNO | R    | ΔR   | Δa*  | Δb*  |
|----|---------|---------|------|------|------|------|
| 23 | 200     | 300     | 32.4 | −2.5 | 1.0  | 1.0  |
| 24 | 400     | 400     | 29.5 | 0.8  | 0    | 0    |
| 25 | 300     | 300     | 34.6 | −2.1 | 2.3  | 2.3  |
| 26 | 200     | 200     | 30.7 | −2.4 | 1.6  | 1.6  |
| 27 | 300     | 250     | 34.3 | −1.2 | 1.4  | 1.4  |
| 28 | 300     | 350     | 33.6 | 0.6  | −0.3 | −0.3 |
| 29 | 300     | 350     | 34.3 | −2.4 | 2.8  | 2.8  |

The superposed arrangement of high-index layers readily leads to an increase in overall reflection. The mechanical and chemical properties are satisfactory.

EXAMPLES 30 TO 32

All these examples are conducted using a system of reflective layers including a titanium oxide layer deposited from a ceramic target (TXO). The upper layers are composed of an alloy of titanium oxide and zirconium oxide to 50% by weight (30) or to 25% of zirconium oxide (31), or also of a layer similar to the previous one covered by a layer of a triple alloy of titanium, zirconium and silicon oxides (45/45/6% by weight respectively, the target additionally containing yttrium oxide without any particular function) referred to as TZSO (32).

|    | TXO | TZO(TZSO) | R     | ΔR    | Δa*   | Δb*   |
|----|-----|-----------|-------|-------|-------|-------|
| 30 | 350 | 100       | 30.96 | 3.16  | −0.14 | 2.52  |
| 31 | 107 | 352       | 28.38 | −1.03 | −0.13 | −0.31 |
| 32 | 107 | 352 + 100 | 29.98 | −0.19 | 0.15  | −0.35 |

The effect of the TXO layer on reflection is once again clearly demonstrated. Even with the same total thicknesses Example 30 that has the thickest TXO layer is more reflective than Example 31. The addition of the TSZO layer also increases the reflection of Example 32 in comparison to that of Example 30.

The invention claimed is:

1. A glazing comprising:
   a glass sheet, and
   at least one sputtered layer,
   wherein said at least one sputtered layer comprises (1) zirconium oxide in an amount of between 25% and 60% by weight, and (2) titanium oxide in a proportion by weight of not less than 40% and not more than 75%,
   wherein the thickness of the at least one sputtered layer is in the range of between 150 and 900 Å, and
   wherein the glazing has a reflection of at least 15% and a light transmission of at least 60% when said glass sheet is a clear float glass sheet and has a thickness of 4 mm.

2. The glazing according to claim 1, wherein the thickness of the at least one sputtered layer is selected so that the glazing has a reflection of 20% to 40% when the glass sheet is a clear float glass sheet and has a thickness of 4 mm.

3. The glazing according to claim 1, wherein the thickness of the at least one sputtered layer is selected so that the glazing has an absorption of less than 20% of the incident light when the glass sheet is a clear float glass sheet and has a thickness of 4 mm.

4. The glazing according to claim 1, wherein the glazing passes tests of resistance to condensation, to saline mist and the acidity test as defined in the draft standard prEN 1096-2.

5. The glazing according to claim 1, wherein a CIE system colour in reflection is such that with illuminant D and at a solid angle of 10° in relation to the normal to the glazing, a CIE system parameter a*≤0 and a CIE system parameter b*≤6.

6. The glazing according to claim 1, wherein measured haze does not exceed 2% when the glazing is subjected to a thermal treatment of at least 550° C. for 5 minutes.

7. The glazing according to claim 1, further comprising at least one oxide layer with a higher refractive index than that of the sputtered layer located between the sputtered layer and the glass sheet.

8. The glazing according to claim 7, wherein the at least one oxide layer with the higher refractive index is a layer of titanium oxide.

9. The glazing according to claim 8, further comprising at least one tin oxide-based layer arranged between the glass sheet and the sputtered layer.

10. The glazing according to claim 9, wherein the tin oxide-based layer comprises at least 30% by weight of tin oxide, the remainder being formed essentially of zinc oxide.

11. The glazing according to claim 10, wherein the tin oxide-based layer has a thickness that is not more than 1.2-times the thickness of the sputtered layer.

12. The glazing according to claim 1, wherein the at least one sputtered layer is covered by a layer for protection against abrasion, said layer being composed of sputtered carbon or a polymer layer.

13. The glazing according to claim 12, wherein said glazing is subjected to thermal treatment such as bending/toughening that results in the removal of the protective layer.

14. The glazing according to claim 1, wherein the glass sheet is a solidly coloured sheet with a dominant wavelength in reflection $\lambda_m$ in the case of illuminant D65 at a solid angle of 2° in the range of between 475 and 600 nm.

15. The glazing according to claim 1, wherein the at least one sputtered layer is formed from titanium oxide and zirconium oxide in substantially equal proportions by weight, and wherein a layer formed from tin oxide and zinc oxide in substantially equal proportions by weight is arranged between the glass sheet and the titanium oxide-based layer.

16. The glazing according to claim 1, wherein the thickness of the at least one sputtered layer is in the range of between 200 and 500 Å.

17. The glazing according to claim 3, wherein the thickness of the at least one sputtered layer is selected so that the glazing has an absorption of less than 10% of the incident light when the glass sheet is a clear float glass sheet and has a thickness of 4 mm.

18. The glazing according to claim 6, wherein the measured haze does not exceed 1% when the glazing is subjected to a thermal treatment of at least 550° for 5 minutes.

19. The glazing according to claim 1, wherein the at least one sputtered layer comprises zirconium oxide in an amount of between 40% and 55% by weight.

20. The glazing according to claim 10, wherein the tin oxide-based layer comprises at least 40% by weight of tin oxide, the remainder being formed essentially of zinc oxide.

* * * * *